(«12») United States Patent
Toftner et al.

(10) Patent No.: US 9,539,620 B2
(45) Date of Patent: Jan. 10, 2017

(54) APPARATUS FOR IN-SITU CLEANING OF A SEISMIC STREAMER CABLE

(75) Inventors: Peer Toftner, Yven (NO); Denis Murphy, Kinsale (IE)

(73) Assignee: CGG DATA SERVICES AG, Zug (CH)

( * ) Notice: Subject to any disclaimer, the term of this patent is extended or adjusted under 35 U.S.C. 154(b) by 1520 days.

(21) Appl. No.: 12/886,430

(22) Filed: Sep. 20, 2010

(65) Prior Publication Data

US 2012/0067368 A1    Mar. 22, 2012

(51) Int. Cl.
B08B 1/00 (2006.01)
G01V 1/38 (2006.01)
G01V 13/00 (2006.01)

(52) U.S. Cl.
CPC .............. *B08B 1/008* (2013.01); *G01V 13/00* (2013.01); *A46B 2200/3013* (2013.01); *A46B 2200/3073* (2013.01); *G01V 1/38* (2013.01)

(58) Field of Classification Search
USPC .................. 134/201; 15/88, 104.04; 248/340
See application file for complete search history.

(56) References Cited

U.S. PATENT DOCUMENTS

| | | | |
|---|---|---|---|
| 358,306 A * | 2/1887 | Tiebout | 114/303 |
| 3,953,827 A | 4/1976 | Le Moal et al. | |
| 5,077,861 A * | 1/1992 | Bokat | 15/256.5 |
| 5,351,359 A * | 10/1994 | Golden | 15/256.6 |
| 6,263,823 B1 | 7/2001 | Olivier | |
| 7,145,833 B1 | 12/2006 | Hoogeveen | |
| 7,409,919 B2 | 8/2008 | Hoogeveen et al. | |
| 2003/0226488 A1 | 12/2003 | Grieger et al. | |
| 2004/0125697 A1 | 7/2004 | Fleming | |
| 2007/0223307 A1 | 9/2007 | Storteig et al. | |
| 2009/0141587 A1 | 6/2009 | Welker et al. | |
| 2012/0002503 A1 | 1/2012 | Janiszewski et al. | |

FOREIGN PATENT DOCUMENTS

| | | |
|---|---|---|
| GB | 2452148 A | 2/2009 |
| WO | 2005/096018 A1 | 10/2005 |
| WO | 2009/005939 A1 | 1/2009 |

OTHER PUBLICATIONS

VWHeritage, http://www.vwheritage.com/vw_spares_Horn-push-semi-circle-113951531F_act_shop.product_pID_54929_lang_EN_country_GB.htm, VWHeritage—Beetle 1966-71 Horn Ring.pdf.*

(Continued)

*Primary Examiner* — Michael Barr
*Assistant Examiner* — Levon J Shahinian
(74) *Attorney, Agent, or Firm* — Patent Portfolio Builders PLLC (57) ABSTRACT

A system, method and apparatus providing uninterrupted cleaning of first and second parts of a deployed marine seismic streamer cable using one cleaner apparatus, the first and second parts located to respective sides of a bird attached to the streamer cable. The system comprises a connecting apparatus for connecting by a web or rung the bird to the streamer cable, and the cleaner apparatus provided with a slit open over the full length of the cleaner and adapted to let the web or rung pass from end to end of the cleaner, whereby the cleaner is allowed to pass from the first part to the second part without interrupting its cleaning action.

11 Claims, 6 Drawing Sheets

(56) References Cited

OTHER PUBLICATIONS

VWHeritage, Parts—Beetle 1966-71 Horn Ring.pdf.*
TheSamba.com, http://www.thesamba.com/vw/archives/manuals/67bug/67bug.pdf, 1967 VW Beetle Owners Manual.pdf, 1966.*
Norwegian Search Report dated Nov. 30, 2012 in related Norwegian Patent Application No. 20120520.
International Search Report mailed Sep. 20, 2013 in related International Application No. PCT/NO2013/050082.
Written Opinion mailed Sep. 20, 2013 in related International Application No. PCT/NO2013/050082.

* cited by examiner

APPARATUS FOR IN-SITU CLEANING OF A SEISMIC STREAMER CABLE

TECHNICAL FIELD

The present invention relates to a marine seismic streamer cable cleaning method, and apparatus for same. More particularly the present invention relates to a method for operating a marine seismic streamer cable cleaning device that travels along the deployed marine seismic streamer cable while cleaning it, to carry out an essentially uninterrupted cleaning operation as is passes at least one "bird" device that is affixed to a part of at least a section of the marine seismic streamer cable that is being cleaned, and an apparatus adapted to allow a marine seismic streamer cable cleaning device that travels along the deployed marine seismic marine streamer cable while cleaning it, to carry out an essentially uninterrupted cleaning operation as is passes at least one "bird" device that is affixed to a part of at least a section of the marine seismic streamer cable that is being cleaned.

BACKGROUND OF THE INVENTION

The problem of fouling and marine growth of seismic streamer cables, and the effects on the characteristics of the marine seismic streamer cables, with regard to at least drag, steerability, positioning and reception of seismic signals, is well known to persons skilled in the art of marine seismic information acquisition.

Several devices for cleaning deployed marine seismic streamer cables, operating by travelling along the deployed cable while removing e.g., fouling and marine growth, are known in the art, and properly disclosed, such as for example devices disclosed in U.S. Pat. No. 7,145,833 and U.S. Pat. No. 7,409,919.

The need for controlling the position of a deployed marine seismic streamer cable in several directions, typically to a certain depth, and also to follow a particular path as the streamer cable is being towed behind a vessel, is typically met by attaching to the cable, at intervals, steering devices and other devices for communication and control such as e.g., depth control devices often referred to by the term "bird". In this disclosure of the present invention, when referring to a "bird", reference is also made to other devices that typically are attached to the streamer cable, in particular devices that are attached to the streamer cable at locations along the streamer cable that are submerged when the streamer cable is deployed. The typical "bird" is equipped with a wing means and/or body elements, extending also outwards from the streamer cable, to perform the function of e.g., actually move to or hold a corresponding part of the streamer cable in a desired position, is usually removeably attached to the streamer cable. That will allow removal of the "bird" at the time when the streamer cable is recovered from sea and wound up on a drum on the towing vessel, as winding the cable on a drum while still having the "bird" with its sharp edged wing, or rudder, attached to the streamer cable would easily cause serious damage to the relatively fragile streamer cable.

The "bird" typically extends significantly away from the streamer cable, typically a distance that is several multiples of the diameter of the streamer cable itself.

Several arrangements for removably attaching a "bird" to a marine seismic streamer cable are well known in the art, such as e.g., from disclosures provided in patent publication No. U.S. 2003/0226488 and U.S. Pat. No. 6,263,823.

Accordingly, when a cleaning device travelling along the deployed marine seismic streamer cable arrives at a position along the cable where it encounters a "bird" attached to the streamer cable, it also encounters an obstacle for its further travel along the streamer cable. Known solutions to this problem are considered complex and far from optimal, e.g., either because they required additional, risky operative effort at sea by the crew to bring the streamer cable to the surface for temporarily removing the "bird" to let the cleaning device pass the point of attachment of the "bird" to the streamer cable, or for removing the cleaner temporarily and reattaching it to the next section of the streamer cable, or because existing cleaning devices that are adapted to pass by a "bird" while it is attached to the streamer cable, typically due to their complexity are not as reliable as one would like, or for that same reason are expensive to acquire, operate and maintain.

Hence, there is a need for a solution to the problem of making a substantially full-length cleaning a deployed marine seismic streamer cable having a plurality of "birds" attached thereto, that is at least one of more reliable, involves less risk both to the crew, is less costly, or solves other related problems that are well-known to those involved in the use, handling and operation of marine seismic streamer cables for marine seismic information acquisition.

BRIEF SUMMARY OF THE INVENTION

The present invention provides a method for substantially uninterrupted full-length cleaning of a deployed marine seismic streamer cable having a plurality of "birds" attached thereto, the method exhibiting the features recited in one or more of the accompanying method patent claims.

The present invention provides a system adapted for allowing substantially uninterrupted full-length cleaning of a deployed marine seismic streamer cable having a plurality of "birds" attached thereto, the system exhibiting the features recited in one or more of the accompanying system patent claims.

The present invention provides an apparatus adapted for a system for allowing substantially uninterrupted full-length cleaning of a deployed marine seismic streamer cable having a plurality of "birds" attached thereto, the apparatus exhibiting the features recited in one or more of the accompanying apparatus patent claims.

BRIEF DESCRIPTION OF THE DRAWINGS

In the following, the invention will be explained in more detail by way of example, and with reference to the attached drawings, in which.

DETAILED DESCRIPTION OF THE INVENTION

Figure 1:
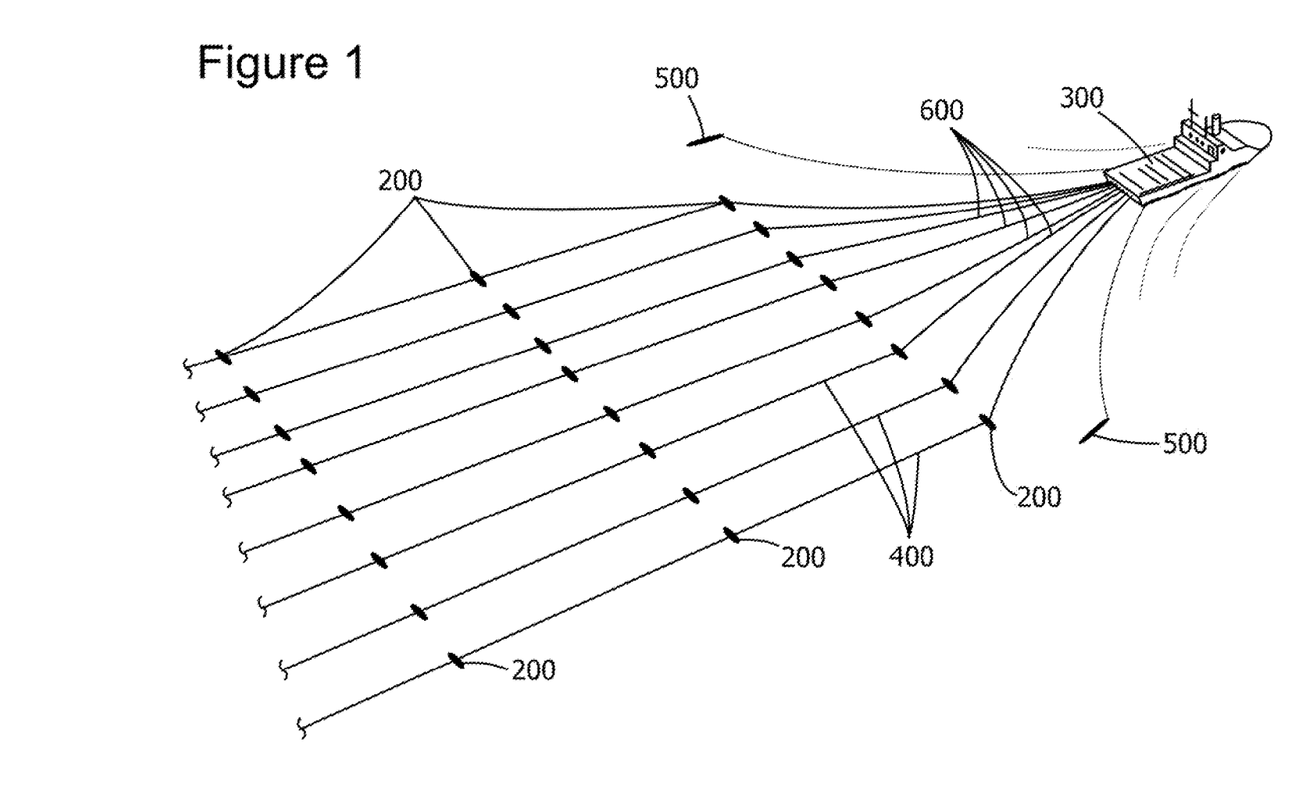
FIG. 1 illustrates in a perspective view drawing an example of vessel towing a plurality of marine seismic streamer cables furnished with "birds"

Referring first to FIG. 1, a typical illustration of an marine seismic information acquisition operation is provided, showing a vessel 300 towing a plurality of seismic sources 600, such as e.g. air guns, a seismic spread comprising plurality of marine seismic streamer cables 400 each furnished with a plurality of "birds" 200, and deflector devices 500 arranged to effect lateral spacing of the streamer cables 400 constituting the seismic spread.

Figure 2:
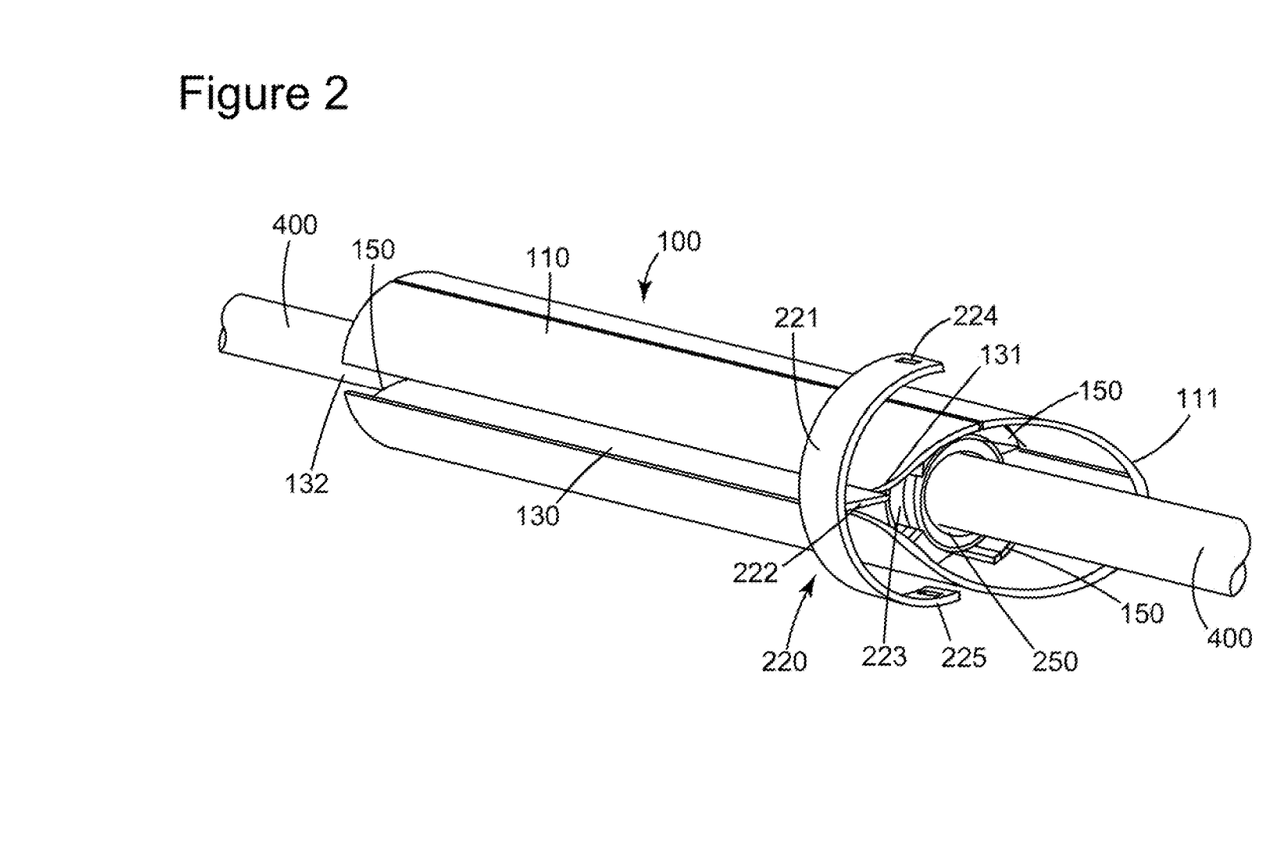
FIG. 2 illustrates in a perspective view drawing an example of a system, and apparatus parts of system, for cleaning a deployed marine seismic streamer cable, according to an embodiment of the present invention.
Figure 3:
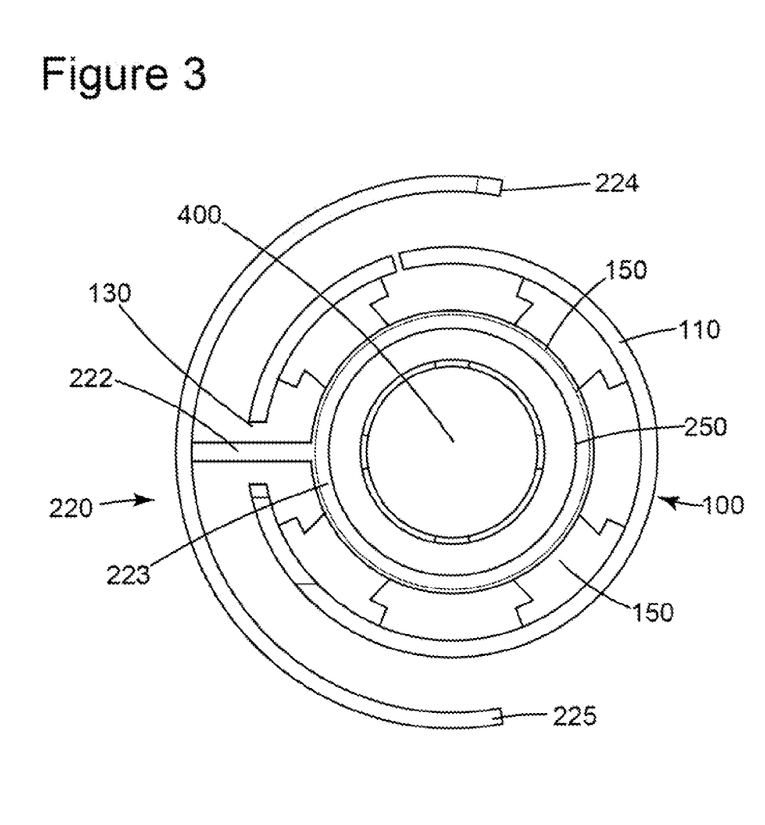
FIG. 3 illustrates in a cross section view type drawing the example of a system, and apparatus parts of system, for cleaning a deployed marine seismic streamer cable, of FIG. 2.

Referring to FIGS. 2 and 3, a streamer cable cleaning method, and a system and apparatus parts of system, for cleaning a deployed marine seismic streamer cable, according to an embodiment of the present invention is shown, and will be explained in the following. The system includes a movable cleaner 100 being adapted to be applied to and essentially surround a part of, and to travel along, the streamer cable 400, and a connecting apparatus 220 representing an embodiment of an element of a bird arrangement, which element provides means for connecting the bird to the streamer cable 400 and for maintaining the bird in a fixed position in the longitudinal direction of the streamer cable 400. The cleaner 100 embodiment being illustrated is comprised of an elongate, tubular-shaped body 110, carrying on its inside cleaning devices 150, such as e.g., a brush or a plurality of brush segments. The cleaner 100 embodiment being illustrated is adapted to travel along the streamer cable from left to right, implying also that towing vessel would be located beyond the left side of the area of the drawing FIG. 2. It is contemplated that the cleaner 100 is equipped with additional means for effecting motion of the cleaner 100 to make it travel along the streamer cable 400. However the extent to which such means will be required will depend on the type of fouling or growth and how well it sticks to the surface of the streamer cable, and also on the surface characteristics of the streamer cable itself. Accordingly, the cleaner embodiment as illustrated in FIG. 2, may by its shape and cross section area be driven to travel along the streamer cable with sufficient force to perform effective cleaning just by the force provided by the surrounding water as the cable is being towed through the water. It is also contemplated that the cleaner 100 could be equipped with means for it to rotate about its longitudinal center axis, which would generally coincide with the longitudinal center axis of the streamer cable 400 when it has been appropriately been applied to the stream cable 400. Means that may be needed for applying the cleaner to the streamer cable for performing cleaning, and for removing it after cleaning, or for other reasons, are considered known to a person skilled in the art, and are therefore not expanded on in this disclosure.

In its travel along the streamer cable for performing surface cleaning of the streamer cable 400, the cleaner 100 will at some point encounter a bird 200 attached to the cable, and will need to "negotiate", and pass by the bird for it to continue its cleaning of a next section of the cable located beyond the point of attachment of the bird. For allowing the cleaner according to the present invention to pass a bird attached to the cable, by itself; and in a simple and reliable way, the cleaner 100 is provided with means that will cooperate with a connecting apparatus 220 that connects the bird 200 to the streamer cable. Accordingly, the present invention provides a connecting apparatus 220 that is adapted to cooperate with the cleaner 100 for allowing it to simply slide past the part of the streamer cable 400 where the bird is located, without interrupting of the cleaning process carried out by the cleaner 100.

According to the invention, the tubular cleaner 100 is provided with a slit 130 running uninterrupted in the longitudinal direction of the tubular cleaner 100, from a front end 131 end to a rear end 132 of the cleaner 100, and the connecting apparatus 220 for connecting the bird 200 to the streamer cable 400 comprises an inner substantially annulus or ring shaped, optionally a substantially semi-annulus or semi-ring shaped, part 223 adapted to attach the connecting apparatus to the streamer cable 400, optionally by means of an adapter 250 affixed to the streamer cable, the inner part having an outer surface, a rung or web part 222 having an inner end rigidly attached at the outer surface of the inner part 223 and extending therefrom to an outer end in a substantially radial direction with respect a center axis of the inner part 223, and an outer substantially semi-annulus or semi-ring shaped part 221, being adapted at first 224 and second 225 ends thereof for attaching thereto respective parts of the bird that provide flotation, steering means and attitude control means, the outer part 221 having an inner surface at which the outer end of the rung or web part 222 is rigidly attached. A center axis of an annulus or ring that may would correspond to the semi-annulus or semi-ring shape of the outer part would advantageously be parallel to a center axis of the inner part 223, and more advantageously also coincide with a center axis of the inner part 223 for the outer part 221 and the inner part 223 to appear concentric with respect to each other.

It is contemplated that the tubular cleaner 100 is provided with means to perform alignment of the slit 130 with the rung or web part 222, at least at the time when the cleaner 100 travelling along the streamer cable 400 arrives at a location of the streamer cable at which a bird is located. In the embodiment illustrated in FIG. 2, means for alignment is provided at the leading end 111 of the cleaner 100 by the front part being cut at angle with respect to the longitudinal direction of the elongate cleaner 100, so as to effect a rotation of the bird 200 when the front end of the bird 200 is in engagement with a side edge of the rung or web part 222, until the slit 130 becomes aligned with the rung or web part 222. At this point, the rung or web part 222, which is dimensioned to be narrower than the width of the slit 130, enters the slit opening at its front end 131 and allows the cleaner 100 to slide and travel past the connecting apparatus 220, and at the end of the passing of the cleaner 100, the rung or web part 222 will appear to emerge or exit from the slit at its rear end 132.

Figure 4:
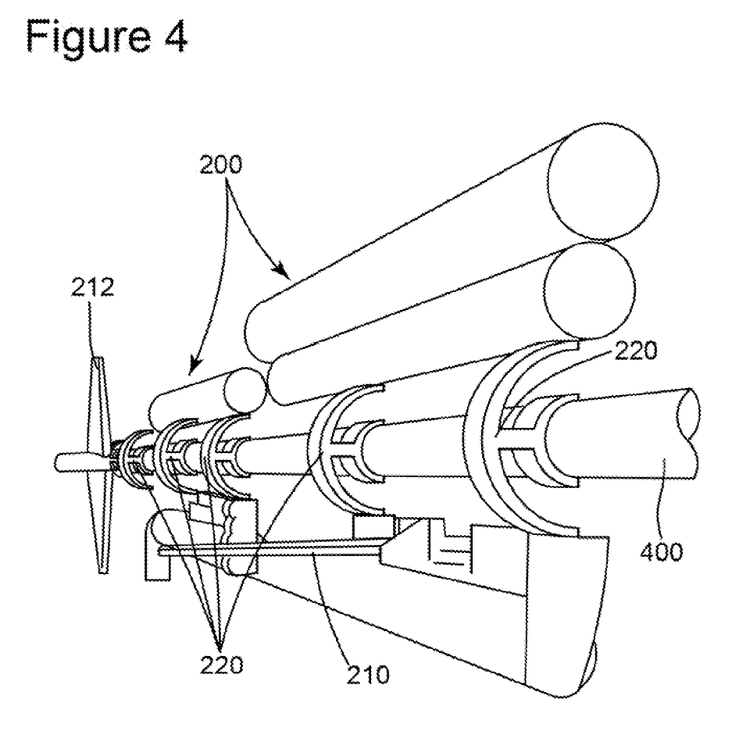
FIG. 4 illustrates in a perspective view drawing an example of a bird attached to a deployed marine seismic streamer cable, including an apparatus according to an embodiment of the present invention.

In the following, further applications and aspects of the invention is elucidated upon with reference to the illustrations provided in FIG. 4, in particular with regard to the connecting apparatus 220. FIG. 4 illustrates by way of example a typical arrangement of various devices that often are attached to the streamer cable, in conjunction with a typical bird, for positioning at least a part of the streamer cable, or additionally for acquiring information relating to the operation of collecting seismic information or the seismic information itself. In the example illustrated in FIG. 4, the tow vessel is located to the right of the arrangement shown in the drawing, implying that the deployed seismic streamer cable is moving in a direction from left towards right. Attached to the streamer cable, and located above it, are shown, from right to left, first to juxtaposed cylinders being part of a typical bird for controlling vertical position, followed by a single cylindrical device being part of a "pinger" type acoustic transceiver/communication unit for determining the position of the corresponding part of the streamer cable. Located below the streamer cables are shown, from right to left, a further part of the typical bird device, including horizontal wings 210, followed by further parts of the acoustic transceiver/communication unit. To the far left, is illustrated a typical lateral controller, comprising a rudder 212, to allow for control of the horizontal position of the deployed streamer cable as it is being towed by the vessel, typically at speeds around 4 knots, which corresponds to about 7.5 km/h. Other examples of auxiliary or external devices that may be attached to a seismic streamer cable are retrievers, speed logs and velocimeters. As illustrated by way of example in FIG. 4, common to such units included in employments of the present invention, is the units are attached to the seismic streamer cable by one or more of a connector apparatus 220 according to the invention.

Although the apparatus 220 in the examples described above include an outer part 221 of a symmetric and semi-annular or semi-ring shape, which is considered advantageous for keeping to a minimum drag caused by the connecting apparatus as the streamer cable is pulled through water by the tow vessel, the 221 outer part could take other shapes for being ideally adapted to the design of units for which it is used to connect to the streamer cable. As an example, not illustrated in the drawings, the outer part could be shaped to exhibit an "L" shaped lower section and an upper section shaped like an inverted "L", possibly such section of generally "L" shape but with soft bends, i.e., bends not being represented by distinct, sharp corners like in the letter "L", but more towards the shape of the letter "J", still rigidly connected to the inner part 223 by the web or rung 222 to form a rigid connector apparatus 220 that provides a space between the inner 223 and outer 221 parts that gives room for a cleaner 100 to pass. Accordingly, in other embodiments of the marine seismic cleaner system according to the present invention, the shape of the generally tubular the cleaner 100, in a cross section taken about perpendicular to a longitudinal axis of the cleaner 100, need not be of that of a circle, but could be that of an ellipse, a substantially symmetric polygon, a square, or even a rectangle.

Furthermore, an arrangement of various devices attached to the streamer cable like those mentioned above, of which an example of an arrangement of such some are illustrated in FIG. 4, not all devices need be located right above or right below the streamer cable, but could be located shifted to one or the other side of the streamer cable, in which case at least the outer part 221 of the connecting apparatus 220 is adapted to provide first 224 and second 225 ends offset accordingly from the mid axis of the inner part 223, such as e.g., in a plane that would shift both the upper and lower parts of the bird 200 to one side of the streamer cable. By such shift, even more room would be provided for allowing a cleaner device 100 travelling along the streamer cable to freely pass at the point of connection of the bird to the streamer cable.

Furthermore, the rung or web 222 need not be rigidly connected to the outer part at a mid point thereof, for being e.g. horizontally, as it is shown in the illustrative examples in the accompanying drawings, but could in use instead be positioned inclined in relation to the horizontal plane, and be attached closer to one of the first 224 or second 225 ends of the outer part 221.

It should be noted, that the outer part could be shaped to span an angle more or less than the about 180 degrees that is illustrated in the accompanying drawings. In particular, in cases where elements of bird are already furnished with adapters for coupling them to the first 224 or the second 225 ends of the outer part 221 of the connecting apparatus, such adapters could form part or parts of the outer part 221 for it to extend sufficiently for both providing support and connection for the bird to the streamer cable, and for providing a connector apparatus 220 for the marine seismic streamer cleaner system of the invention.

In the following, a further embodiment of a cleaner 100 according to the invention, and a variant thereof, will be explained with reference to FIGS. 5 and 6, respectively.

Figure 5:
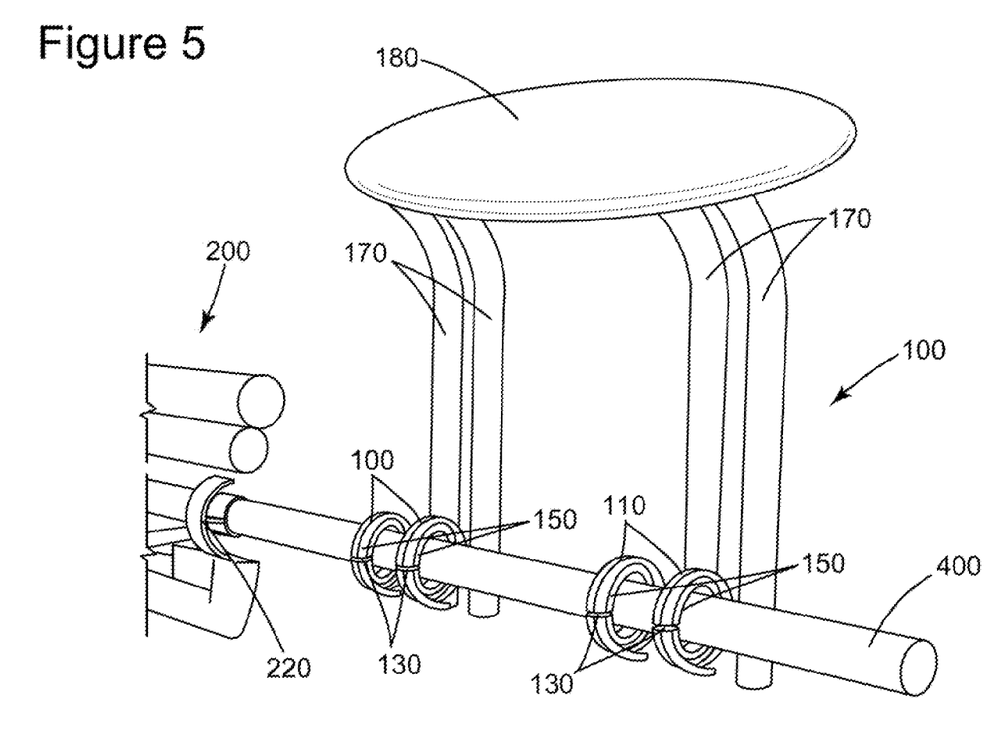
FIG. 5 illustrates in a perspective view drawing a part bird attached to a deployed marine seismic streamer cable, including a further example of a system, and apparatus parts of system, according to a further embodiment of the present invention.

In FIG. 5 is illustrated a cleaner 100 arrangement, comprising a plurality of tubular, optionally ring shaped, cleaner element bodies 110, having each attached to its interior surface respective brush elements 150, and each provided with respective slits 130 for the cleaner element bodies 110 to allowing a rung or web 222 of a connecting apparatus 220 according to the invention to slide by the cleaner element bodies 110, or vice versa. In order for the slits of the cleaner element bodies 110 to be appropriately aligned with the web or rung 222 at a time when the travelling cleaner 100 according to the invention arrives at a connector apparatus 220 according to the invention, the cleaner elements bodies 110 are individually or in groups attached to a floater 180 by respective distance pieces or "arms" 170. The floater 180 provides by its buoyancy a vertically oriented force that keeps it at all times stably above the cleaner elements bodies 100, thereby also keeping the slits of the cleaner elements bodies 100 substantially constantly at a predefined radially oriented direction that is coinciding with the radially oriented direction of the web or rung 222 of the connecting apparatus 220.

Figure 6:
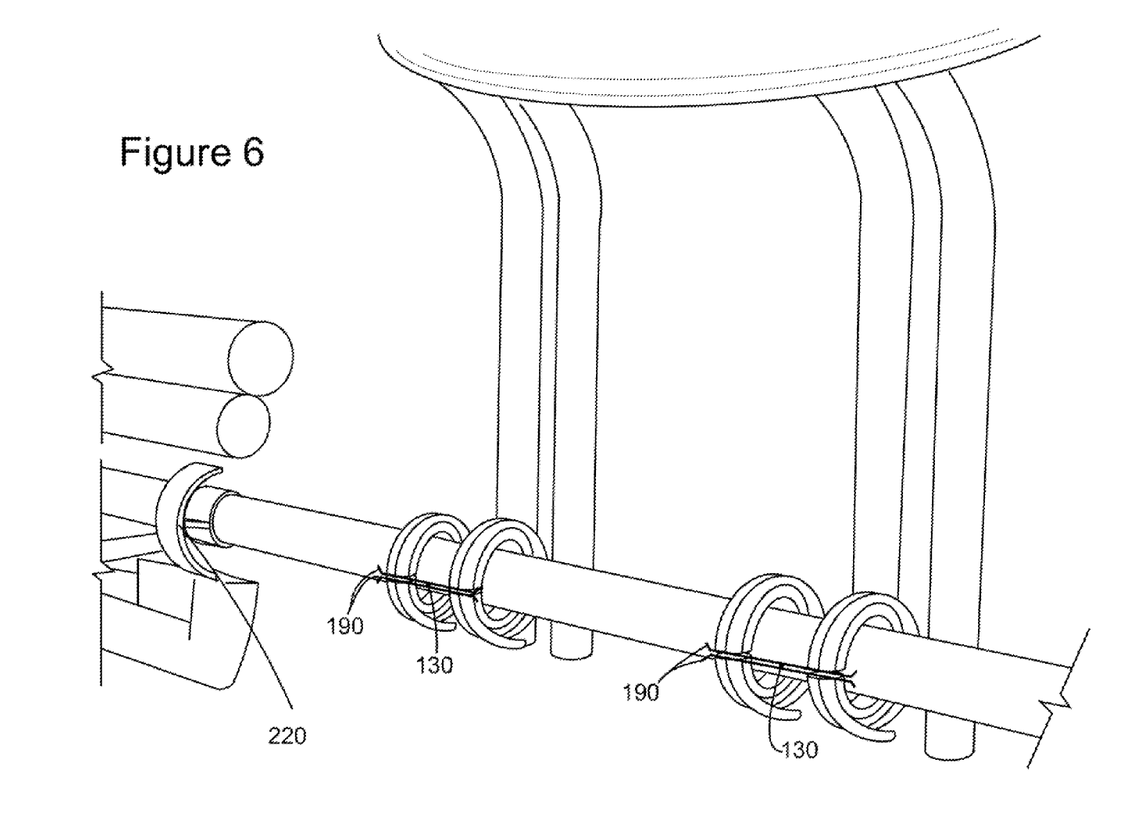
FIG. 6 illustrates in a perspective view drawing an example of a system corresponding to the system illustrated in FIG. 5, with a further embodiment of apparatus parts of the system, for cleaning a deployed marine seismic streamer cable.

The variant illustrated in FIG. 6 is further provided with upper and lower guide rails 190 attached to the cleaner element bodies 110 adjacently above and below, respectively, the slits. In the example of FIG. 6, which includes four cleaner element bodies 110, two groups each including two cleaner element bodies 110 share a set of upper and lower guide rails. By including the guide rails, generally shaped as shown in FIG. 6, slits may be made narrow while still easily be made to be aligned with the web or rung 222 of the connecting apparatus as the cleaner 100 encounters the connecting apparatus 220.

In a method according to the invention, a bird device 200 is connected to a connecting apparatus 220 comprising the outer part 221, the web or rung 222 and inner part 223 as disclosed herein, the connecting apparatus 220 is attached to a marine seismic streamer cable 400, the interconnected assembly of bird device 200, connecting apparatus 220 and marine seismic streamer 400 are deployed at sea and towed by a vessel 300, a cleaner 100 having one or more slits 130 as disclosed herein is applied to the cable at a first part of the marine seismic streamer cable 400 that is located closer to the vessel than the location of the deployed interconnected assembly, the cleaner is allowed to travel by way of drag along the marine seismic streamer cable 400 in a direction away from the vessel 300, and when reaching the interconnected assembly, the one or more slits are aligned with the web or rung 222, the web or rung 222 is guided through the one or more slits, whereby the cleaner 100 passes the interconnected assembly, and the cleaner 100 enters a second part of the marine seismic streamer cable 400 that is located further from the vessel than the location of the deployed interconnected assembly and continues its travel along the second section to clean the second section.

The embodiments of the present invention provide a system, method and apparatus, providing uninterrupted cleaning of first and second parts of a deployed marine seismic streamer cable using one cleaner apparatus, the first and second parts located to respective sides of a bird attached to the streamer cable. The system comprises a connecting apparatus for connecting by a web or rung the bird to the streamer cable, and the cleaner apparatus provided with a slit open over the full length of the cleaner and adapted to let the web or rung pass from end to end of the cleaner, whereby the cleaner is allowed to pass from the first part to the second part without interrupting its cleaning action.

What is claimed is:

1. A tubular cleaner for cleaning a streamer cable towed in water, the tubular cleaner comprising:
   a tubular body configured to encircle the streamer cable;
   a cleaning tool attached to an interior of the tubular body for cleaning the streamer cable, and
   a slit made in a side wall of the tubular body, the slit running uninterrupted in a longitudinal direction of the tubular body, from a front end to a rear end of the tubular body,
   wherein the slit is configured to receive a rung part of a connecting apparatus that is connected to the streamer cable when the tubular body moves along the streamer cable, past the rung part.

2. The tubular cleaner of claim 1, wherein a leading end of the tubular body has a cut to align the rung part with the slit.

3. The tubular cleaner of claim 1, wherein the tubular body is cylindrical.

4. The tubular cleaner of claim 1, further comprising:
   a floater configured to float in water to provide a given orientation to the slit so that the slit is aligned with the rung part.

5. The tubular cleaner of claim 4, further comprising:
   an arm connecting the floater to the tubular body.

6. The tubular cleaner of claim 1, further comprising:
   upper and lower guiding rails for guiding the rung part into the slit.

7. A connecting apparatus for connecting a bird to a streamer cable, the connecting apparatus comprising:
   an inner part configured to attach the connecting apparatus to the streamer cable;
   a rung part having an inner end rigidly attached to an outer surface of the inner part and extending therefrom in a substantially radial direction with respect to a center axis of the inner part;
   an outer part having first and second ends thereof for engaging respective parts of the bird, the outer part having an inner surface at which an outer end of the rung part is rigidly attached; and
   an adapter between the streamer cable and the inner part.

8. The connecting apparatus of claim 7, wherein a center axis of the outer part is substantially parallel to the center axis of the inner part.

9. The connecting apparatus of claim 8, wherein the center axis of the outer part coincides with the center axis of the inner part so that the outer part and the inner part are concentric with respect to each other.

10. The connecting apparatus of claim 7, wherein the inner part is shaped substantially as an annulus or ring.

11. The connecting apparatus of claim 7, wherein the inner part is shaped substantially as a semi-annulus or semi-ring.

* * * * *